May 5, 1970 A. M. SMITH 3,510,783

LOW FREQUENCY-LOW DUTY CYCLE CLOCK PULSE GENERATOR

Filed June 29, 1967

INVENTOR.
ALLAN M. SMITH

BY Edward J. Feeney Jr.

ATTORNEY 3,510,783

LOW FREQUENCY-LOW DUTY CYCLE CLOCK PULSE GENERATOR

Allan M. Smith, Moorestown, N.J., assignor to Burroughs Corporation, Detroit, Mich., a corporation of Michigan Filed June 29, 1967, Ser. No. 650,113
Int. Cl. H03k 3/64, 5/153
U.S. Cl. 328—63 10 Claims

ABSTRACT OF THE DISCLOSURE

The present application discloses a two phase low frequency clock pulse generator which is responsive to selected pulses of a high frequency clock signal. The generator has a low frequency output pulse duration which is substantially equal to the period of one high frequency clock time. It utilizes a sine wave signal generator having a low frequency output signal in conjunction with a pair of uniquely interconnected flip-flop circuits and a plurality of AND gates. The circuit provides narrow clock pulses at a low repetition rate for selectively clocking high speed electronic circuits. It may be used whereever a two-phase clock of low repetition rate is required. This clock pulse generating system may also be considered to be the logical equivalent of a blocking oscillator.

BACKGROUND OF THE INVENTION

Field of the invention

Often in electronic data processing systems the operation of various electronic circuits in the system are controlled by sequences of timing or clock pulses. These pulses are usually provided by very elaborate and highly stable pulse generating systems. This stability is necessary since these pulses are used, for example, to insure that various units of the data processing system are properly synchronized and operate at predetermined times. In most present day data processing systems the logic and gating circuits of the equipment are designed so as to operate at a predetermined frequency or repetition rate and usually the basic clock frequency of the system is maintained at this predetermined frequency by a highly stable oscillator circuit. In these configurations, however, it is often necessary to create additional circuitry to provide various groups or pulse sequences. For example, it is often desirable to have a pulse generator which is capable of operating at repetition rates which are a multiple or submultiple of the oscillator frequency.

Also certain applications require different pulse lengths or duty cycles. It should be noted here that the repetition rate of a wave train refers to the number of pulses which are generated during a particular time period whereas the duty cycle of the wave train refers to the ratio of one pulse length to one complete pulse period. The repetition rate therefore may be expressed, for example, in pulses per second while the duty cycle is noted as a percentage. Thus a 50% duty cycle is one wherein the pulse duration is equal to one half of the period between corresponding portions of successive pulses. It is therefore an important feature of this invention to provide common pulses which have a repetition rate or frequency which is a submultiple of the basic clock frequency. Still other applications require clock signals which possess certain phase relationships. It is also a feature of this invention to provide timing pulses for use in any application which requires a two-phase synchronizing source.

Description of the prior art

Many previous pulse generating systems which included the ability of supplying a source of pulses whose repetition rates were a submultiple of the basic pulse rate included a plurality of bistable stages such as those used in a counter or shift register. To obtain low frequency signals which bore some sort of submultiple relationship with the basic clock frequency, the output signal was usually taken from different stages of the register or counter. One example of such prior art used two input decoding gates wherein the timing pulses had a repetition rate which was a multiple or a submultiple of the oscillator frequency. By using three input decoding gates the timing pulses may have still another repetition rate than the oscillator frequency.

BRIEF SUMMARY OF THE INVENTION

The present invention relates to a logic system which operates on a high frequency input clock and produces at its output a series of low frequency pulses. The present system consists basically of two logic blocks. Each of these blocks includes a flipflop circuit together with its associated circuitry connected in a cascade relationship. Each logic block includes a flipflop circuit and two AND gating circuits. The output of each flipflop is fed back as one input of each AND circuit in its logic block. The other inputs to the AND gates of the first logic block consist of the low frequency oscillator which in effect determines the threshold of each gate. The high frequency input clock also contributes to this activation. The other inputs to the AND gates of the second logic block are the output of the first flipflop and the output of the high frequency clock circuitry. At the output of the last flipflop are two AND gates whose inputs are the alternate outputs of each flipflop. The outputs of these final AND gates are the desired two-phase low frequency clock pulses. There is also provided a system which produces a low frequency clock pulse with a low duty cycle.

DETAILED DESCRIPTION

Figure 1:
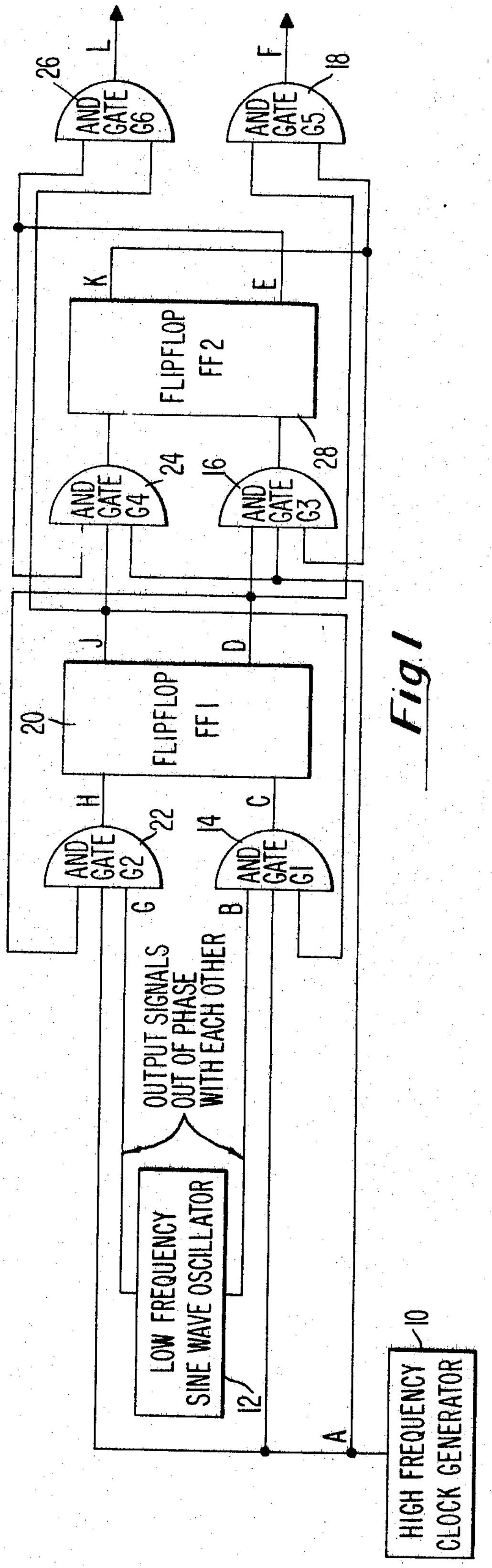
FIG. 1 is a block diagram of the low-frequency-low duty clock pulse generator of the present invention.

The circuit shown in FIG. 1 of the drawings refers particularly to a low frequency-low duty cycle pulse generator. It may be considered for the purposes of this explanation to be the equivalent of two blocking oscillators phased approximately 180° apart. It also includes another individual blocking oscillator, a delay line and a plurality of logic drivers. The preferred embodiment of the fabricated model was constructed of Complimentary Transistor Micrologic (CT$\mu$L) circuits. For example, those CT$\mu$L circuits manufactured by the Fairchild Corporation would provide an entirely satisfactory embodiment. However, almost any type of circuit technique could be used. For the present application for which this circuit was devised, low cost, high compatability and increased flexibility were desired criteria. The low frequency sine wave oscillator 12 denoted in the figure could be any suitable wave oscillator having an output frequency range of five cycles per second to six hundred kilocycles per seconds (5 c.p.s. to 600 kc.p.s.). The output pulses from the present pulse generator when such an input range of signals were utilized were of 50 to 70 nanosecond duration with a period accuracy of better than 0.05%.

Returning to the description of the block diagram of FIG. 1 the operation of the present circuit will now be described. After the output signal of the low frequency oscillator 12 exceeds the threshold level of the AND gate 14, the gate is enabled by the next high frequency clock pulse from the generator 10. On the trailing edge of this clock pulse, the first flipflop 20 changes state. The input to gate 14 from the J output terminal of flipflop 20 inhibits subsequent clock pulses from enabling gate 14 until flipflop 20 is restored to its initial state. On the following clock pulse gate 16 will be enabled and on the trialing edge of that clock pulse, the second flipflop 28 will change state. Thus the second flipflop 28 changes state one high frequency pulse period after the first flipflop 20 changes state. Output AND gate 18 is enabled for this period of time. In a similar manner when the other phase of the low frequency oscillator 12 is applied to gates 22, flipflop 20, gate 24, flipflop 28 and gate 26 will function to restore the first and second flipflops 20 and 28 to their original state and generate a second clock signal approximately 180° from the first clock signal on the output line L and F of gates 26 and 18 respectively.

Figure 2:
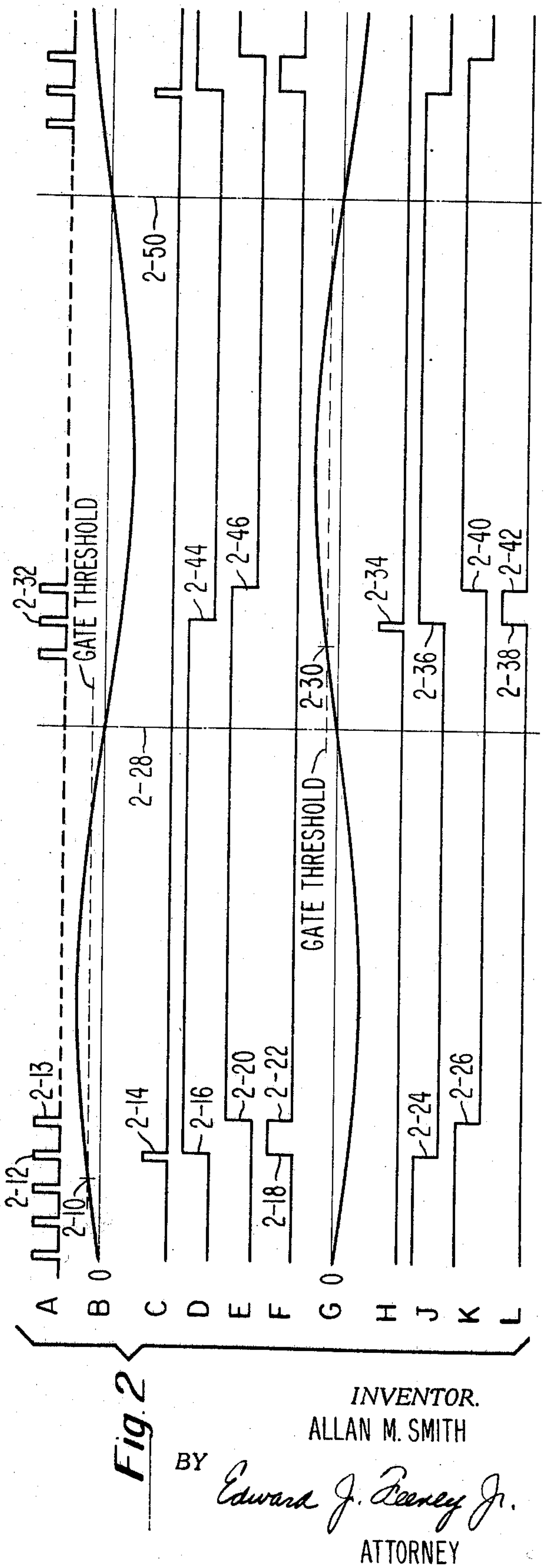
FIG. 2 illustrates a plurality of wave forms which represent the output pulses and sine wave signals at the correspondingly denoted portions of the block diagram of FIG. 1.

Referring next to FIG. 2, there is illustrated a plurality of waveforms drawn for a particular time segment. The alphabetical notation given at the left of each wavetrain corresponds to a certain location in the block diagram of FIG. 1. Thus, the wavetrain denoted A corresponds to the signal present at the output of the frequency clock 10 and denoted A in the FIG. 1 block diagram. Similarly, the sine wave representation denoted as curve B in FIG. 2 corresponds to the signal present on the B output line from the low frequency oscillator 12 illustrated in FIG. 1. The oppositely phased out sine wave from the sine wave oscillator 12 is shown alphabetically in FIG. 2 as curve G. It is important to note, regarding curves B and G, that the gate threshold level of gates 14 and 22 is shown as a dashed line passing through the positive going portions of each of the sine waves at points 2–10, 2–30. Since the waveforms are 180° out of phase one with another, the dashed line crosses the positive going wave of curve G exactly one half cycle after the same thing has happened on the B curve. Consequently, this allows gates 14 and 22 to be alternately enabled by the output phases (G and B) from the oscillator 12. The output signal from gate 14 is shown on curve C of FIG. 2. It is initiated by the occurrence of the first pulse 2–12 of the clock signal train A following the time when the curve B exceeds its gate threshold level (passes point 2–10).

As previously mentioned, the trailing edge of pulse 2–14 activates the first flipflop 20. This activation is noted in curves D and J wherein curve D shifts to its upper level, shown at 2–16, while curve J shifts downward 2–24. Since this lower level signal J is applied to the input of gate 14, successive clock signals, i.e. those immediately following clock pulse 2–12, are unable to reactivate that gate. The increase of signal level 2–16 along line D from flipflop 20 readies gate 16 and the arrival of the trailing edge of pulse 2–13 of the wavetrain A activates the second flipflop 28 to provide a reversal of the levels on its output lines E and K. Thus, the signal level at E which was previously low goes high 2–20 while the high level previously on K goes low 2–26. The presence of this low signal K at the input to gate 18 terminates its output pulse 2–22 on output line F.

As the sine wave output signal on line B passes through its reference level at time 2–28, the output signal on line G starts its climb toward the threshold level. It passes this level at 2–30 and the arrival of the subsequent time pulse 2–32 on line A initiates the output pulse 2–34 on line H. The trailing edge of this pulse provides a positive output level on line J from flipflop 20. This level is thereafter applied to gate 26 where it combines with the high level on line E to provide an output signal on the line L from gate 26.

Finally, as the sine wave signals B and G again pass through their reference levels at time 2–50, the cycle is repeated and the output gate 18 is prepared to provide an output signal.

Thus, there is provided a sequence of output pulses which alternately emanate from gates 18 and 26. In addition, the output signal occur at times which are separated by approximtaely 180°. And finally since the output signals are initiated by the trailing edge of one clock pulse from the high frequency source 10 and terminated by the trailing edge of the next clock pulse from that source, the length of each output signal is equal to the duration of one clock period.

What has been shown and described is a low frequency-low duty cycle clock pulse generator which may be used to provide dual phase narrow clock pulses at a low repetition rate for clocking high speed electronic circuitry, such as, for example, might be used as a timing control in a synchronous data processing system which requires a two phase clock. It accomplishes these features by utilizing a plurality of well-known and often used logical elements. In the presently described system the elements used for flipflops 20 and 28 were manufactured by the Fairchild Corporation. They are known as Complementary Transistor Micrological elements (CTμL) and are specified by Fairchild as CTμL No. 957 (trailing edge type). The gates 14, 16, 18, 22, 24 and 26 are also Complementary Transistor Micrological elements and are known as Fairchild type CTμL No. 954.

Obviously many other elements can be used and modifications of this invention are also possible in light of the above teachings. It is therefore to be understood that within the scope of the appended claims, the invention may be practiced other than as specifically described and illustrated.

What is claimed is:

1. A low frequency-low duty clock pulse generator comprising a high frequency clock pulse source to provide a continuous string of successively recurring pulses at a high rate of repetition, a low frequency oscillator to provide a first and a second phase output signal, a first flip-flop circuit, a first pair of gate circuits connected to said first flip-flop circuit means coupled between said first flip-flop and said first pair of gates to inhibit said flip-flop from successive activation by either one of said first pair of gates, said oscillator connected to said first pair of gates such that said first and said second phase signals from said oscillator are simultaneously and respectively applied thereto, a second flip-flop circuit, a second pair of gate circuits connected to said second flip-flop circuit, means coupled between said first flip-flop and said second pair of gates to inhibit said flip-flop from successive activation by either one of said second pair of gates, said high frequency clock pulse source connected to said first and said second pair of gate circuits, and a third pair of gate circuits connected to said first and said second flip-flop circuits to alternately provide an output pulse of one high frequency clock period duration from each gate of said third pair of output gates in response to each of said first and second phase signals from said low frequency oscillator.

2. The low frequency-low duty cycle pulse generator as set forth in claim 1 wherein said low frequency oscillator is a sine wave oscillator providing the first and second phased output signals.

3. The low frequency-low duty cycle pulse generator as set forth in claim 2 wherein said first and second phased output signals from said sine wave oscillator are separated by 180° to provide a first and a second output signal pulse from said pulse generator which are correspondingly separated.

4. A low frequency-low duty clock pulse generator comprising a high frequency clock pulse source to provide a continuous string of successively recurring pulses at a high rate of repetition, a low frequency sine wave oscillator to provide a first and a second phase of a sine wave signal with said first and second signals having a phase separation therebetween of 180°, a first flip-flop circuit including feedback means, a first and a second AND gate circuit connected to activate said first flip-flop circuit and also connected to its feedback means, said sine wave oscillator connected to said first and second AND gates such that said first and said second phase signals from said oscillator are simultaneously and respectively applied to said first and second AND gates, a second flip-flop circuit including feedback means, a third and a fourth AND gate circuit connected to activate said second flip-flop circuit and also connected to its feedback means, said high frequency clock pulse source connected to said first, said second, said third and said fourth AND gate circuits, and a fifth and a sixth AND gate circuit connected to said first and said second flip-flop circuits to alternately provide from said fifth and said sixth AND gates an output pulse of one clock period duration during each half cycle period of said low frequency sine wave oscillator.

5. The low frequency-low duty cycle oscillator as set forth in claim 4 wherein said first, second, third and fourth AND gates are three-input AND gates and said fifth and sixth AND gates are two-input gates.

6. The low frequency-low duty cycle clock pulse generator as set forth in claim 4 wherein each of said flip-flop circuits includes an input and an output means with feedback means connected from said output means through a pair of AND gates to said flip-flop input means to provide said flip-flop with a feed-back signal such that said flip-flop is inhibited from being reactivated by successive signals applied to either one of said pair of AND gates.

7. The low frequency-low duty cycle clock pulse generator as set forth in claim 6 wherein said input means and said output means of each of said first and second flip-flop circuits include a set and a reset input terminal with a corresponding set and reset output terminal, and each flip-flop feedback means includes an AND gate coupling between the reset output terminal of a flip-flop circuit and its set input means and another AND gate coupling between the set output terminal of the flip-flop circuit and reset input terminal thereof.

8. A low frequency-low duty cycle clock pulse generator comprising a source of high frequency clock pulses, a source of low frequency sine wave signals including means to provide a first and a second output signal wherein said first signal is out of phase with said second signal, a first flip-flop circuit having a set and a reset input terminal and corresponding output terminals, a first AND gate circuit connected between the first output signal means of the low frequency source and the set input terminal of the first flip-flop, a second AND gate circuit connected between the second output signal means of the low frequency source and the reset input terminal of the first flip-flop, a second flip-flop circuit also having a set and a reset input terminal and corresponding output terminals, a third AND gate circuit connected between the set output terminal of said first flip-flop and the set input terminal of said second flip-flop circuit, a fourth AND gate circuit connected between the reset output terminal of said first flip-flop and the reset input terminal of said second flip-flop, the set output terminals of said first and second flip-flops connected to said second and fourth AND gates respectively and the reset output terminals of said first and second flip-flops also respectively connected to said first and third AND gates, a fifth AND gate connected to the reset output terminal of said first flip-flop and the set output terminal of said second flip-flop to provide a first low frequency-low duty cycle output pulse and a sixth AND gate connected to the set output terminal of said first flip-flop and the reset output terminal of said second flip-flop to provide a second low frequency-low duty cycle output pulse which is phase separated by 180° from said first output signal.

9. The low frequency-low duty cycle clock pulse generator as set forth in claim 8 wherein said first and second flip-flop circuits are identical complementary transistor micrological elements and said first, second, third, fourth, fifth and sixth AND gate circuits are also identical complementary transistor micrological gate elements.

10. The low frequency-low duty cycle clock pulse generator as set forth in claim 9, wherein said identical complementary transistor micrological flip-flop elements are of the type which are activated by the negative-going trailing edge of an input set and reset pulse.

References Cited

UNITED STATES PATENTS 3,454,884 7/1969 Zichm ------------ 328—196 X

DONALD D. FORRER, Primary Examiner

B. P. DAVIS, Assistant Examiner

U.S. Cl. X.R.

307—269; 328—196